US012658748B2

(12) United States Patent
Miyama et al.

(10) Patent No.: US 12,658,748 B2
(45) Date of Patent: Jun. 16, 2026

(54) ROTATING ELECTRIC MACHINE

(71) Applicant: Mitsubishi Electric Corporation, Tokyo (JP)

(72) Inventors: Yoshihiro Miyama, Tokyo (JP); Takeshi Kubota, Tokyo (JP); Kengo Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 17/456,014

(22) Filed: Nov. 22, 2021

(65) Prior Publication Data

US 2022/0271584 A1     Aug. 25, 2022

(30) Foreign Application Priority Data

Feb. 25, 2021     (JP) ................................. 2021-028570

(51) Int. Cl.
H02K 1/276 (2022.01)
H02K 21/14 (2006.01)

(52) U.S. Cl.
CPC ........... H02K 1/2766 (2013.01); H02K 21/14 (2013.01)

(58) Field of Classification Search
CPC ........ H02K 1/2766; H02K 21/14; H02K 1/27; H02K 1/2706; H02K 1/272; H02K 1/274; H02K 1/276
USPC ........................... 310/156.01, 156.57, 156.56
See application file for complete search history.

(56) References Cited

U.S. PATENT DOCUMENTS 6,717,314 B2 *   4/2004  Horst .................... D06F 37/304
                                                      310/156.01
7,834,505 B2 *  11/2010  Lee ...................... H02K 1/2766
                                                      310/156.56
7,868,502 B2 *   1/2011  Lee ........................ H02K 1/276
                                                      310/156.56
7,902,712 B2 *   3/2011  Nakamasu ............. H02K 16/04
                                                      310/156.56

(Continued)

FOREIGN PATENT DOCUMENTS

JP       2002-238190 A      8/2002
JP       2008-148482 A      6/2008

(Continued)

OTHER PUBLICATIONS

WO 2018128043 A1_Translation (Year: 2023).*

(Continued)

Primary Examiner — Maged M Almawri
Assistant Examiner — Ahmed F Seck
(74) Attorney, Agent, or Firm — Sughrue Mion, PLLC

(57) ABSTRACT

Provided is a rotating electric machine, including a rotor, the rotor including: a rotor core; a first permanent magnet inserted into a first magnet slot; and a second permanent magnet inserted into a second magnet slot. The rotor core includes an inter-pole hole portion formed between the first magnet slot and the second magnet slot. When a circle having a rotation axis as a center and circumscribing an edge portion of each of the first magnet slot and the second magnet slot on the stator side is defined as a first circle, the inter-pole hole portion is arranged on a side opposite to the stator with respect to the first circle, and an edge portion of the inter-pole hole portion on the stator side is formed along the first circle.

9 Claims, 6 Drawing Sheets

(56)     References Cited

U.S. PATENT DOCUMENTS

| | | | | |
|---|---|---|---|---|
| 8,102,091 | B2 * | 1/2012 | Ionel | H02K 1/2766 |
| | | | | 310/156.53 |
| 8,598,763 | B2 * | 12/2013 | Aota | H02K 1/276 |
| | | | | 310/156.56 |
| 8,803,394 | B2 * | 8/2014 | Sano | H02K 1/2766 |
| | | | | 310/216.106 |
| 2008/0136281 | A1 * | 6/2008 | Fujii | H02K 1/2766 |
| | | | | 310/156.08 |
| 2010/0176682 | A1 | 7/2010 | Kori et al. | |
| 2011/0012461 | A1 | 1/2011 | Tomigashi | |
| 2012/0133239 | A1 | 5/2012 | Taema et al. | |
| 2015/0115758 | A1 | 4/2015 | Koka et al. | |
| 2016/0126790 | A1 * | 5/2016 | Piech | H02K 1/2766 |
| | | | | 310/156.12 |
| 2016/0301271 | A1 | 10/2016 | Saito et al. | |
| 2020/0244121 | A1 * | 7/2020 | Takahashi | H02K 21/14 |
| 2020/0336031 | A1 * | 10/2020 | Takahashi | H02K 1/165 |

FOREIGN PATENT DOCUMENTS

| | | | | | |
|---|---|---|---|---|---|
| JP | 2010-161883 | A | 7/2010 | | |
| JP | 2012-120326 | A | 6/2012 | | |
| JP | 2012-120413 | A | 6/2012 | | |
| JP | 2013-225997 | A | 10/2013 | | |
| JP | 2019140369 | A * | 8/2019 | | H01F 1/22 |
| WO | 2009/116572 | A1 | 9/2009 | | |
| WO | 2015/076045 | A1 | 5/2015 | | |
| WO | WO-2018128043 | A1 * | 7/2018 | | |

OTHER PUBLICATIONS

JP2019140369A-Translation (Year: 2024).*

Notice of Reasons for Refusal dated Feb. 22, 2022 from the Japanese Patent Office in Japanese Application No. 2021-028570.

Chinese Office Action dated Oct. 30, 2025 in Application No. 202210128966.8.

* cited by examiner

ROTATING ELECTRIC MACHINE

BACKGROUND OF THE INVENTION

1. Field of the Invention

The present disclosure relates to a rotating electric machine including a rotor core in which a plurality of magnet slots are formed, and a plurality of permanent magnets inserted into the plurality of magnet slots, respectively.

2. Description of the Related Art

In Patent Literature 1, a motor is described. A rotor portion of this motor includes a rotor core and a plurality of field magnets. The rotor core includes a plurality of magnet holding holes into which the plurality of field magnets are inserted, respectively, and a plurality of flux barrier holes each formed between two magnet holding holes adjacent to each other. A reinforcing member formed of a material having magnetic permeability lower than that of the rotor core is filled in each flux barrier hole.

CITATION LIST

Patent Literature

[PTL 1] JP 2008-148482 A

According to the above-mentioned motor, the strength of the rotor core can be increased while short-circuit of a magnet magnetic flux inside the rotor core is suppressed. However, also in the above-mentioned motor, the rigidity of the rotor core differs between a magnetic-pole portion in which the field magnet is embedded, and an inter-magnetic-pole portion located between two magnetic-pole portions adjacent to each other in the circumferential direction. Thus, there is a problem in that, during rotation of a rotor, stress concentration is liable to be caused in a boundary portion between the magnetic-pole portion and the inter-magnetic-pole portion.

SUMMARY OF THE INVENTION

The present disclosure has been made to solve the problem as described above, and has an object to provide a rotating electric machine capable of relaxing stress concentration caused in a rotor core during rotation of a rotor.

According to at least one embodiment of the present disclosure, there is provided a rotating electric machine, including: a stator; and a rotor provided so as to be rotatable with respect to the stator, wherein the rotor includes: a rotor core in which a first magnet slot and a second magnet slot adjacent to each other in a circumferential direction are formed; a first permanent magnet inserted into the first magnet slot; and a second permanent magnet inserted into the second magnet slot, wherein a polarity of a magnetic-pole surface of the first permanent magnet which is opposed to the stator and a polarity of a magnetic-pole surface of the second permanent magnet which is opposed to the stator are different from each other, wherein the rotor core includes an inter-pole hole portion formed between the first magnet slot and the second magnet slot so as to extend in an axial direction, and wherein, when, in a cross section perpendicular to the axial direction, a circle having a rotation axis of the rotor as a center and circumscribing an edge portion of each of the first magnet slot and the second magnet slot on the stator side is defined as a first circle, in the cross section, the inter-pole hole portion is arranged on a side opposite to the stator with respect to the first circle, and, in the cross section, an edge portion of the inter-pole hole portion on the stator side is formed along the first circle.

According to the present disclosure, stress concentration caused in the rotor core during the rotation of the rotor can be relaxed.

DESCRIPTION OF THE EMBODIMENTS

First Embodiment

Figure 1:
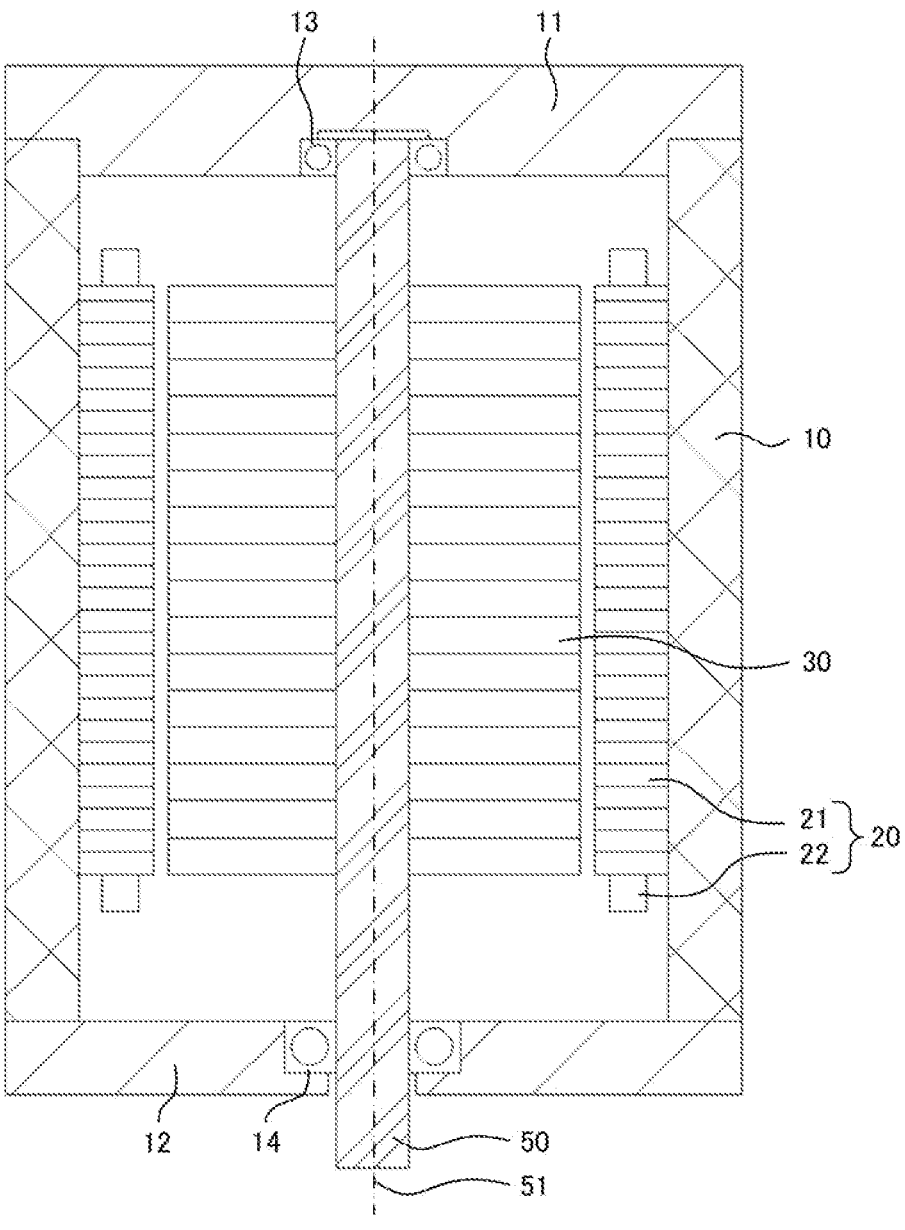
FIG. 1 is a sectional view for illustrating a configuration of a rotating electric machine according to a first embodiment, which is taken along a rotation axis.

A rotating electric machine according to a first embodiment is described. FIG. 1 is a sectional view for illustrating a configuration of the rotating electric machine according to this embodiment, which is taken along a rotation axis. In this embodiment, a motor of an inner rotor type is described as the rotating electric machine. In the following description, a direction along a rotation axis 51 is defined as an "axial direction", a direction along a circumference around the rotation axis 51 in a cross section perpendicular to the axial direction is defined as a "circumferential direction", and a direction along a radius of a rotor 30 in the same cross section is defined as a "radial direction".

As illustrated in FIG. 1, the rotating electric machine includes a frame 10, a rear-side bracket 21, a front-side bracket 12, a rear-side bearing 13, a front-side bearing 14, a stator 20, the rotor 30, and a shaft 50.

The frame 10 has a cylindrical shape. The rear-side bracket 11 is fitted to one end side of the frame 10. The front-side bracket 12 is fitted to the other end side of the frame 10. The rear-side bearing 13 includes an outer ring fixed to the rear-side bracket 11, and an inner ring fixed to the shaft 50. The front-side bearing 14 includes an outer ring fixed to the front-side bracket 12, and an inner ring fixed to the shaft 50. The shaft 50 is rotatably supported on the rear-side bracket 11 and the front-side bracket 12. The shaft 50 extends along the rotation axis 51 being a rotation center of the rotor 30.

The stator 20 is fixed to an inner peripheral side of the frame 10. The rotor 30 is arranged on an inner peripheral side of the stator 20. An inner peripheral portion of the stator 20 and an outer peripheral portion of the rotor 30 are opposed to each other via a gap. The rotor 30 is provided so as to be rotatable with respect to the stator 20. The shaft 50 is fixed to an inner peripheral side of the rotor 30.

The stator 20 includes a stator core 21 and a coil 22. The stator core 21 is formed by laminating a plurality of thin plates each formed of a magnetic material. The coil 22 is mounted to the stator core 21.

Figure 2:
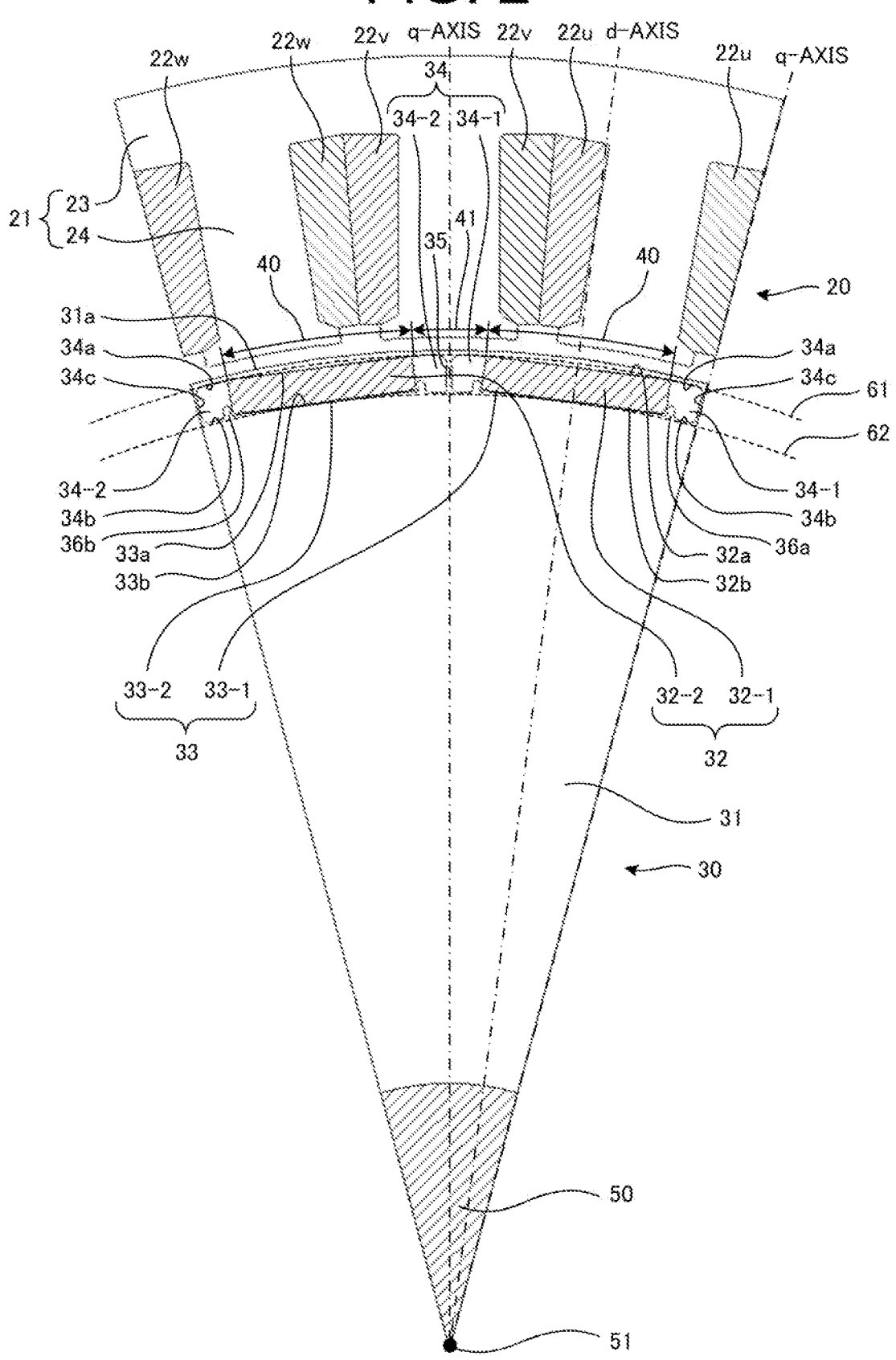
FIG. 2 is a sectional view for illustrating a configuration of a part of the rotating electric machine according to the first embodiment, which is taken perpendicularly to the rotation axis.

FIG. 2 is a sectional view for illustrating a configuration of a part of the rotating electric machine according to this embodiment, which is taken perpendicularly to the rotation axis. As illustrated in FIG. 2, the stator core 21 includes a yoke portion 23 and a plurality of tooth portions 24. The yoke portion 23 has an annular shape. Each of the plurality of tooth portions 24 protrudes from the yoke portion 23 toward a radially inner side. The plurality of tooth portions 24 are arranged at equal intervals in the circumferential direction. In this embodiment, thirty-six tooth portions 24 are provided.

The coil 22 includes a U phase coil 22u, a V phase coil 22v, and a W phase coil 22w. The U phase coil 22u, the V phase coil 22v, and the W phase coil 22w are sequentially wound around each of the tooth portions 24 in the circumferential direction.

The rotor 30 includes a rotor core 31 and a plurality of permanent magnets 32. The rotor core 31 includes a plurality of magnet slots 33 formed therein. The plurality of magnet slots 33 are arranged in parallel to each other in the circumferential direction along an outer peripheral surface 31a of the rotor core 31. Each of the magnet slots 33 extends along the axial direction. In the circumferential direction of the rotor 30, a portion in which each of the plurality of magnet slots 33 is formed serves as a magnetic-pole portion 40 of the rotor 30, and a portion between two magnetic-pole portions 40 adjacent to each other serves as an inter-magnetic-pole portion 41 of the rotor 30.

In this embodiment, twenty-four magnetic slots 33 are provided. The plurality of permanent magnets 32 are inserted into the plurality of magnet slots 33, respectively. Each of the permanent magnets 32 has a rectangular flat-plate shape. Each of the magnet slots 33 has a rectangular cross-sectional shape which conforms to a cross section of each of the permanent magnets 32. In the cross section illustrated in FIG. 2, a longitudinal direction of each of the magnet slots 33 is perpendicular to the radial direction.

In the following, one of two magnet slots 33 adjacent to each other in the circumferential direction may be referred to as a first magnet slot 33-1, and the other may be referred to as a second magnet, slot 33-2. Further, the permanent magnet 32 inserted into the first magnet slot 33-1 may be referred to as a first permanent magnet 32-1, and the permanent magnet 32 inserted into the second magnet slot 33-2 may be referred to as a second permanent magnet 32-2.

An arrangement direction and a magnetization direction of each of the plurality of permanent magnets 32 extend along the radial direction of the rotor 30. Each of the plurality of permanent magnets 32 includes a first magnetic-pole surface 32a and a second magnetic-pole surface 32b. The first magnetic-pole surface 32a is directed to an outer peripheral side of the rotor 30 and is opposed to the stator 20. The second magnetic-pole surface 32b is directed to the inner peripheral side of the rotor 30. A polarity of the first magnetic-pole surface 32a of the first permanent magnet 32-1 and a polarity of the first magnetic-polo surface 32a of the second permanent magnet 32-2 are different from each other. When the polarity of the first magnetic-pole surface 32a of the first permanent magnet 32-1 is an N pole, the polarity of the first magnetic-pole surface 32a of the second permanent magnet 32-2 is an S pole. The plurality of permanent magnets 32 are provided such that the first magnetic-pole surfaces 32a each having an N pole and the first magnetic-pole surfaces 32a each having an S pole are alternately arranged along the circumferential direction of the rotor 30. As described above, the rotating electric machine of this embodiment forms a concentrated winding motor including twenty-four poles and thirty-six slots.

In the cross section perpendicular to the axial direction, an edge portion 33a, which is an edge portion of each of the magnet slots 33 and is located on the cuter, peripheral side, that is, the stator 20 side, is formed in a linear shape along the first magnetic-pole surface 32a of the permanent magnet 32. In the same cross section, an edge portion 33b, which is an edge portion of each of the magnet slots 33 and is located on the inner peripheral side, that is, a side opposite to the stator 20, is formed in a linear shape along the second magnetic-pole surface 32b of the permanent magnet 32.

In the rotor core 31, two inter-pole hole portions 34 are formed between the first magnet slot 33-1 and the second magnet slot 33-2. One of the two inter-pole hole portions 34 is adjacent to the first magnet slot 33-1 and is formed integrally with the first magnet slot 33-1. The other of the two inter-pole hole portions 34 is adjacent to the second magnet slot 33-2 and is formed integrally with the second magnet slot 33-2. Each of the inter-pole hole portions 34 extends along the axial direction. Each of the inter-pole hole portions 34 also functions as a flux barrier for reducing short-circuit of a magnetic flux of the permanent magnet 32 inside the rotor core 31. The inter-pole hole portions 34 may be hollow. Alternatively, a non-magnetic member may be filled in each of the inter-pole hole portions 34.

In the following, the inter-pole hole portion 34 formed integrally with the first magnet slot 33-1 may be referred to as a first inter-pole hole portion 34-1, and the inter-pole hole portion 34 formed integrally with the second magnet slot 33-2 may be referred to as a second inter-pole hole portion 34-2.

A rib portion 35 being a part of the rotor core 31 is formed between the first inter-pole hole portion 34-1 and the second inter-pole hole portion 34-2. The rib portion 35 extends along the axial direction. In the cross section perpendicular to the axial direction, the rib portion 35 extends along the radial direction. When a circumferential center portion of each of the first permanent magnet 32-1 and the second permanent magnet 32-2 is defined as a magnetic pole center, that is, a d-axis, a q-axis which is electrically and magnetically orthogonal to the d-axis is arranged at a circumferential position shifted from the d-axis by an electric angle of 90°. The rib portion 35 is formed on the q-axis and extends along the q-axis.

The first inter-pole hole portion 34-1 and the second inter-pole hole portion 34-2 are adjacent to each other in the circumferential direction across the rib portion 35. An edge portion 34a, which is an edge portion of the first inter-pole hole portion 34-1 and is located on the outer peripheral side, that is, the stator 20 side, and an edge portion 34b, which is an edge portion of the first inter-pole hole portion 34-1 and is located on the inner peripheral side, that is, on the side opposite to the stator 20, are connected to each other by the rib portion 35. Similarly, an edge portion 34a of the second inter-pole hole portion 34-2 and an edge portion 34b of the second inter-pole hole portion 34-2 are connected to each other by the rib portion 35.

In the cross section illustrated in FIG. 2, an edge portion 34c of the first inter-pole hole portion 34-1, which serves as one side surface of the rib portion 35, extends along the q-axis. In the same cross section, an edge portion 34c of the second inter-pole hole portion 34-2, which serves as the other side surface of the rib portion 35, extends along the q-axis.

A distance between the edge portion 34c of the first inter-pole hole portion 34-1 and the edge portion 34c of the second inter-pole hole portion 34-2, that, is, a circumferential width of the rib portion 35 is equal to or smaller than a distance between the edge portion 34a of the first inter-pole hole portion 34-1 and the outer peripheral surface 31a of the rotor core 31. Further, a distance between the edge portion 34c of the first inter-pole hole portion 34-1 and the edge portion 34c of the second inter-pole hole portion 34-2 is equal to or smaller than a distance between the edge portion 34a of the second inter-pole hole portion 34-2 and the outer peripheral surface 31a of the rotor core 31.

The first inter-pole hole portions 34-1 are provided so as to be adjacent to one circumferential end side and the other circumferential end side of the first magnet slot 33-1. The first magnet slot 33-1 and the two first inter-pole hole portions 34-1 provided on both sides of the first magnet slot. 33-1 so as to be adjacent thereto are integrated as one hole. The second inter-pole hole portions 34-2 are provided so as to be adjacent to one circumferential end side and the other circumferential end side of the second magnet slot 33-2. The second magnet slot 33-2 and the two second inter-pole hole portions 34-2 provided on both sides of the second magnet slot 33-2 so as to be adjacent, thereto are integrated as one hole.

Here, in the cross section illustrated in FIG. 2, a circle having the rotation axis 51 as a center and circumscribing the edge portion 33a of the first magnet slot 33-1 and the edge portion 33a of the second magnet slot 33-2 is defined as a first circle 61. The rotating electric machine of this embodiment is of an inner rotor type, and hence the first circle 61 is a circumscribing circle having the rotation axis 51 as a center and circumscribing both the first magnet slot 33-1 and the second magnet slot 33-2.

Further, in the cross section illustrated in FIG. 2, a circle having the rotation axis 51 as a center and circumscribing the edge portion 33b of the first magnet slot 33-1 and the edge portion 33b of the second magnet slot 33-2 is defined as a second circle 62. The rotating electric machine of this embodiment is of an inner rotor type, and hence the second circle 62 is an inscribing circle having the rotation axis 51 as a center and inscribing both the first magnet slot 33-1 and the second magnet slot 33-2.

In the cross section illustrated in FIG. 2, the entire first inter-pole hole portion 34-1 is arranged on the side opposite to the stator 20 with respect to the first circle 61. Similarly, the entire second inter-pole hole portion 34-2 is arranged on the side opposite to the stator 20 with respect to the first circle 61. Both the first inter-pole hole portion 34-1 and the second inter-pole hole portion 34-2 do not project to the outer peripheral side from the first circle 61.

In the cross section illustrated in FIG. 2, each of the edge portion 34a of the first inter-pole hole portion 34-1 and the edge portion 34a of the second inter-pole hole portion 34-2 is formed in an arc shape along a circumference of the first circle 61, In this embodiment, each of the edge portion 34a of the first inter-pole hole portion 34-1 and the edge portion 34a of the second inter-pole hole portion 34-2 matches the circumference of the first circle 61. The edge portion 34a of the first inter-pole hole portion 34-1 is smoothly connected to one end of the edge portion 33a of the first magnet slot 33-1. The edge portion 34a of the second inter-pole hole portion 34-2 is smoothly connected to the other end of the edge portion 33a of the second magnet slot 33-2.

In the cross section illustrated in FIG. 2, the entire first inter-pole hole portion 34-1 is arranged on the stator 20 side with respect to the second circle 62. Similarly, the entire second inter-pole hole portion 34-2 is arranged on the stator 20 side with respect to the second circle 62. Both the first inter-pole hole portion 34-1 and the second inter-pole hole portion 34-2 do not project to the inner peripheral side from the second circle 62.

In the cross section illustrated in FIG. 2, each of the edge portion 34b of the first inter-pole hole portion 34-1 and the edge portion 34b of the second inter-pole hole portion 34-2 is formed in an arc shape along a circumference of the second circle 62. Each of the edge portion 34b of the first inter-pole hole portion 34-1 and the edge portion 34b of the second inter-pole hole portion 34-2 is located on the outer peripheral side with respect to the second circle 62. Each of the edge portion 34b of the first inter-pole hole portion 34-1 and the edge portion 34b of the second inter-pole hole portion 34-2 may match the circumference of the second circle 62.

The edge portion 34b of the first inter-pole hole portion 34-1 is connected to the edge portion 33b of the first magnet slot 33-1 via a projecting portion 36a for defining a circumferential position of the first permanent magnet 32-1. Similarly, the edge portion 34b of the second inter-pole hole portion 34-2 is connected to the edge portion 33b of the second magnet slot 33-2 via a projecting portion 36b for defining a circumferential position of the second permanent magnet 32-2.

As described above, the first inter-pole hole portion 34-1 extends from a circumferential end portion of the first, magnet slot 33-1 to the edge portion 34c in the circumferential direction. The second inter-pole hole portion 34-2 extends from a circumferential end portion of the second magnet slot 33-2 to the edge portion 34c in the circumferential direction. A sum of a circumferential distance between the edge portion 34c of the first inter-pole hole portion 34-1 and the q-axis and a circumferential distance between the edge portion 34c of the second inter-pole hole portion 34-2 and the q-axis is equal to the circumferential width of the rib portion 35. Thus, the circumferential distance between the edge portion 34c of the first inter-pole hole portion 34-1 and the q-axis and the circumferential distance between the edge portion 34c of the second inter-pole hole portion 34-2 and the q-axis are set such that sufficient strength is obtained in the rib portion 35.

Each of the first inter-pole hole portion 34-1 and the second inter-pole hole portion 34-2 is formed so as to spread between the first circle 61 and the second circle 62 in the radial direction.

As described above, the rotating electric machine according to this embodiment includes the stator 20, and the rotor 30 provided so as to be rotatable with respect to the stator 20. The rotor 30 includes the rotor core 31, the first permanent magnets 32-1, and the second permanent magnets 32-2. The rotor core 31 includes the first magnet slots 33-1 and the second magnet slots 33-2 adjacent to each other in the circumferential direction. The first permanent magnet 32-1 is inserted into the first magnet slot 33-1. The second permanent magnet 32-2 is inserted into the second magnet slot 33-2. The polarity of the first, magnetic-pole surface 32*a* of the first permanent magnet 32-1 which is opposed to the stator 20 and the polarity of the first magnetic-pole surface 32*a* of the second permanent magnet 32-2 which is opposed to the stator 20 are different from each other. The first inter-pole hole portion 34-1 and the second inter-pole hole portion 34-2 each extending in the axial direction are formed between the first magnet slot 33-1 and the second magnet slot 33-2 in the rotor core 31. In the cross section perpendicular to the axial direction, the circle having the rotation axis 51 of the rotor 30 as a center and circumscribing the edge portion 33*a* which is the edge portion of each of the first magnet slot 33-1 and the second magnet slot 33-2 and is located on the stator 20 side is defined as the first circle 61. In the above-mentioned cross section, each of the first inter-pole hole portion 34-1 and the second inter-pole hole portion 34-2 is arranged on the side opposite to the stator 20 with respect to the first circle 61. In the above-mentioned cross section, the edge portion 34*a*, which is the edge portion of each of the first inter-pole hole portion 34-1 and the second inter-pole hole portion 34-2 and is located on the stator 20 side, is formed along the first circle 61.

In the above-mentioned configuration, the first inter-pole hole portion 34-1 and the second inter-pole hole portion 34-2 are provided between the first magnet slot 33-1 and the second magnet slot 33-2 adjacent to each other in the circumferential direction. In each of the first inter-pole hole portion 34-1 and the second inter-pole hole portion 34-2, at least a radial position of the edge portion 34*a* is close to a radial position of the edge portion 33*a* of each of the first, magnet slot 33-1 and the second magnet slot 33-2. Thus, the average rigidity of the rotor core 31 in the inter-magnetic-pole portion 41 can be made close to the average rigidity of the rotor core 31 in the magnetic-pole portion 40. Thus, during rotation of the rotor 30, stress concentration, which is caused in a boundary portion between the magnetic-pole portion 40 and the inter-magnetic-pole portion 41 due to a centrifugal force, can be relaxed.

Further, the stress concentration, which is caused in the boundary portion between the magnetic-pole portion 40 and the inter-magnetic-pole portion 41, can be relaxed, thereby being capable of reducing a distance between the edge portion 33*a* of each of the first, magnet slot 33-1 and the second magnet slot 33-2 and the outer peripheral surface 31*a* of the rotor core 31. With this, short-circuit of the magnetic flux of the permanent magnet inside the rotor 30 can be reduced. Thus, torque of the rotating electric machine can be improved. Further, an increase in an iron part, of the rotor core 31 can be suppressed, thereby being capable of suppressing an increase in inductance. Thus, output of the rotating electric machine can be improved.

In the motor described in Patent Literature 1, a reinforcing member is embedded in a flux barrier hole. Thus, variation may occur in the strength of a rotor core depending on a joining state between the reinforcing member and the rotor core and a filling state of the reinforcing member in the flux barrier hole. Further, in the motor described in Patent Literature 1, the reinforcing member is embedded in the flux barrier hole. Thus, the weight of a rotor and inertia of the rotor are increased.

In contrast, in this embodiment, the reinforcing member is not required to be embedded in the magnet slot 33. Thus, the variation in the strength of the rotor core 31 can be suppressed, and the increase in the weight of the rotor 30 and the inertia of the rotor 30 can be suppressed.

In the rotating electric machine according to this embodiment, in the cross section perpendicular to the axial direction, the first inter-pole hole portion 34-2 and the second inter-pole hole portion 34-2 are arranged on the stator 20 side with respect to the second circle 62. Here, in the cross section perpendicular to the axial direction, the second circle 62 is a circle having the rotation axis 51 as a center and circumscribing the edge portion 33*b*, which is the edge portion of each of the first magnet slot 33-1 and the second magnet slot 33-2 and is located on the side opposite to the stator 20.

According to this configuration, a radial position of the edge portion 34*b* of each of the first inter-pole hole portion 34-1 and the second inter-pole hole portion 34-2 can be made close to a radial position of the edge portion 33*b* of each of the first magnet slot 33-1 and the second magnet slot 33-2. Thus, the average rigidity of the rotor core 31 in the inter-magnetic-pole portion 41 can be made closer to the average rigidity of the rotor core 31 in the magnetic-pole portion 40. Thus, the stress concentration, which is caused in the boundary portion between the magnetic-pole portion 40 and the inter-magnetic-pole portion 41, can be further relaxed.

In the rotating electric machine according to this embodiment, in the cross section perpendicular to the axial direction, the edge portion 34*a*, which is the edge portion of each of the first, inter-pole hole portion 34-1 and the second inter-pole hole portion 34-2 and is located on the stator 20 side, matches the first circle 61.

According to this configuration, a radial position of the edge portion 34*a* of each of the first inter-pole hole portion 34-1 and the second inter-pole hole portion 34-2 can be made to match a radial position of the edge portion 33*a* of each of the first magnet slot 33-1 and the second magnet slot 33-2. Thus, the stress concentration, which is caused in the boundary portion between the magnetic-pole portion 40 and the inter-magnetic-pole portion 41, can be further relaxed.

In the rotating electric machine according to this embodiment, in the cross section perpendicular to the axial direction, a longitudinal direction of each of the first magnet slot 33-1 and the second magnet slot 33-2 is perpendicular to the radial direction. According to this configuration, d-axis inductance can be reduced, thereby being capable of improving the output of the rotating electric machine.

Second Embodiment

Figure 3:
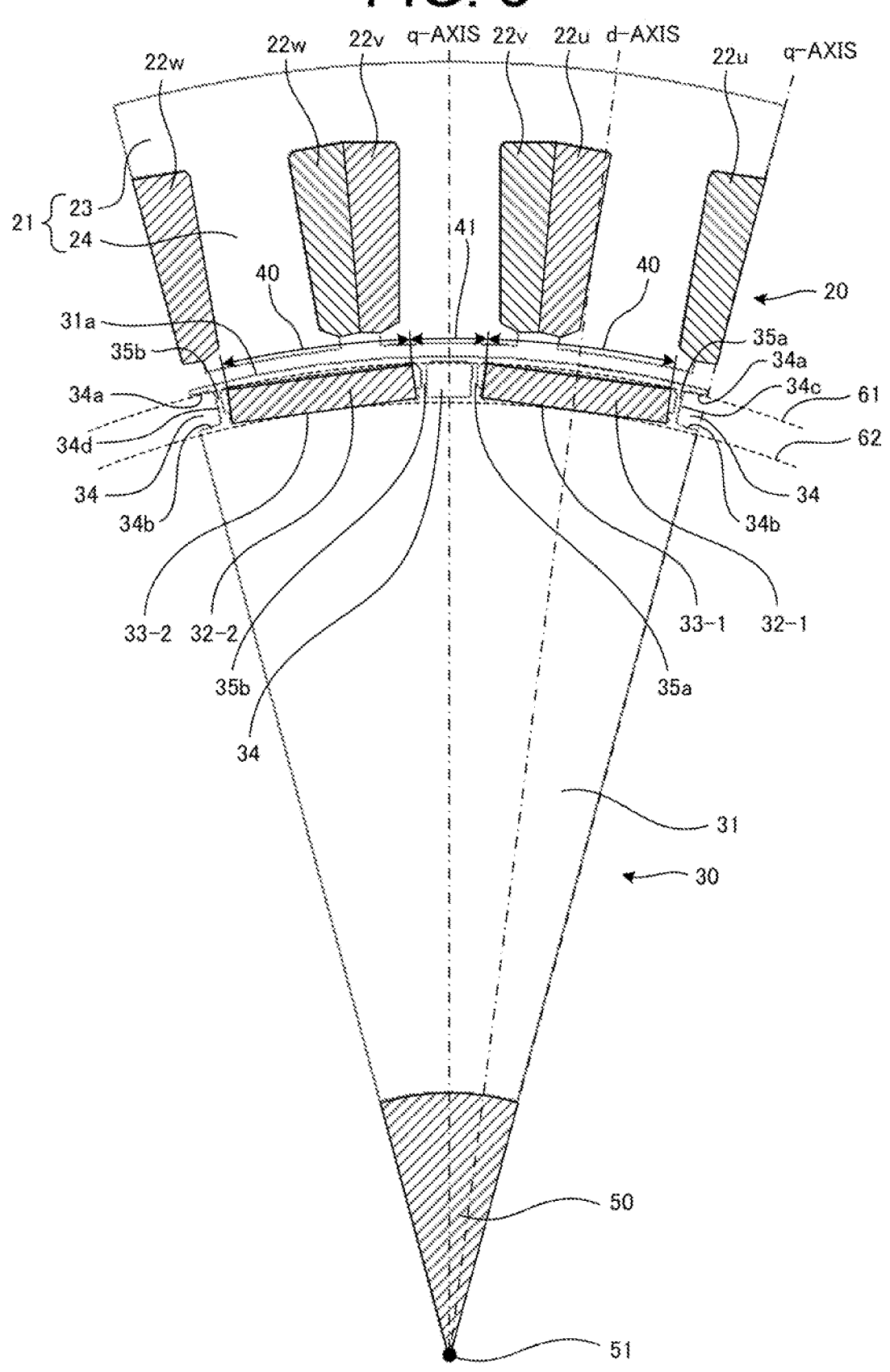
FIG. 3 is a sectional view for illustrating a configuration of a part of a rotating electric machine according to a second embodiment, which is taken perpendicularly to the rotation axis.

A rotating electric machine according to a second embodiment is described. FIG. 3 is a sectional view for illustrating a configuration of a part of the rotating electric machine according to this embodiment, which is taken perpendicularly to the rotation axis. Components having the same function and effect as those of the first embodiment are denoted toy the same reference symbols, and description thereof is omitted.

As illustrated in FIG. 3, one inter-pole hole portion 34 is formed between the first magnet slot 33-1 and the second magnet slot 33-2. The inter-pole hole portion 34 is separate from both the first magnet slot 33-1 and the second magnet slot 33-2. The inter-pole hole portion 34 is surrounded by the edge portion 34*a* and the edge portion 34*b* each formed along the circumferential direction and the edge portion 34*c* and the edge portion 34*d* each formed along the radial direction. The inter-pole hole portion 34 is arranged on the q-axis so as to straddle the q-axis. The q-axis passes through a circumferential center portion of the inter-pole hole portion 34.

A rib portion 35*a* is formed between the inter-pole hole portion 34 end the first magnet slot 33-1. A rib portion 35*b* is formed between the inter-pole hole portion 34 and the second magnet slot 33-2. Each of the rib portion 35*a* and the rib portion 35*b* extends along the radial direction. The inter-pole hole portion 34 and the first magnet slot 33-1 are separated from each other by the rib portion 35*a*. The inter-pole hole portion 34 and the second magnet slot 33-2 are separated from each other by the rib portion 35*b*.

The entire inter-pole hole portion 34 is arranged on the side opposite to the stator 20 with respect to the first circle 61. The inter-pole hole portion 34 does not project to the outer peripheral side from the first circle 61. The edge portion 34*a*, which is the edge portion of the inter-pole hole portion 34 and is located on the stator 20 side, is formed in an arc shape along the circumference of the first circle 61. In this embodiment, the edge portion 34*a* of the inter-pole hole portion 34 matches the circumference of the first circle 61.

The entire inter-pole hole portion 34 is arranged on the stator 20 side with respect to the second circle 62. The inter-pole hole portion 34 does not project to the inner peripheral side from the second circle 62. In this embodiment, the edge portion 34*b*, which is the edge portion of the inter-pole hole portion 34 and is located on the side opposite to the stator 20, is located on the outer peripheral side with respect to the second circle 62. The edge portion 34*b* of the inter-pole hole portion 34 may match the circumference of the second circle 62.

As described above, in the rotating electric machine according to this embodiment, the inter-pole hole portion 34 is separate from both the first magnet slot 33-1 and the second magnet slot 33-2. The inter-pole hole portion 34 is provided so as to straddle the q-axis of the rotor 30.

According to this configuration, the same effects as those of the first embodiment are obtained. Further, the inter-pole hole portion 34 is provided so as to straddle the q-axis, thereby being capable of reducing q-axis inductance. Thus, the output of the rotating electric machine can be further improved.

Further, according to this embodiment, as compared to the first embodiment, each of a distance between the rib portion 35*a* and a circumferential center portion of the first magnet slot. 33-3 and a distance between the rib portion 35*b* and a circumferential center portion of the second magnet slot 33-2 can be reduced. With this, a bending moment caused by a centrifugal force can be reduced, thereby being capable of further reducing stress caused in the rotor core 31 due to the centrifugal force.

Third Embodiment

Figure 4:
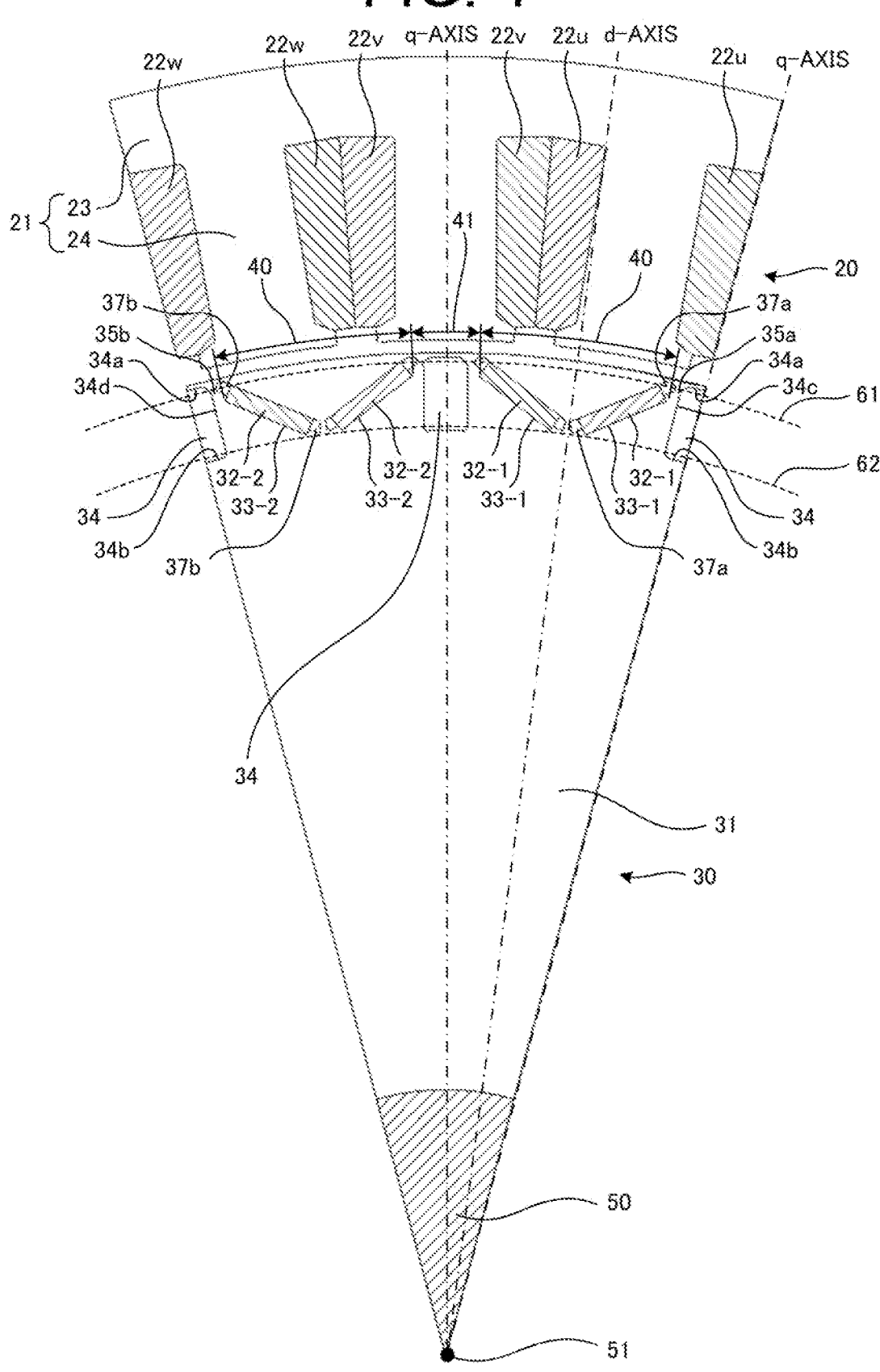
FIG. 4 is a sectional view for illustrating a configuration of a part of a rotating electric machine according to a third embodiment, which is taken perpendicularly to the rotation axis.

A rotating electric machine according to a third embodiment is described. FIG. 4 is a sectional view for illustrating a configuration of a part, of the rotating electric machine according to this embodiment, which is taken perpendicularly to the rotation axis. Components having the same function and effect as those of the first or second embodiment are denoted by the same reference symbols, and description thereof is omitted.

As illustrated in FIG. 4, in the rotor core 31, a plurality of first magnet slot groups and a plurality of second magnet slot groups are formed. Each of the plurality of first magnet slot groups includes two first magnet slots 33-1 arranged in a V shape. Each of the plurality of second magnet slot groups includes two second magnet slots 33-2 arranged in a V shape. The plurality of first magnet slot groups and the plurality of second magnet, slot groups are alternately arranged along the circumferential direction. In this embodiment, twelve sets of the first magnet slot groups and twelve sets of the second magnet slot groups are provided.

The first permanent magnet 32-1 is inserted into each first magnet slot 33-1. The second permanent magnet 32-2 is inserted into each second magnet slot 33-2. Each of the first permanent magnet 32-1 and the second permanent magnet 32-2 has a rectangular flat-plate shape. Two permanent magnets 32 forming one magnetic pole are arranged in a V shape. In the rotor core 31, twenty-four first permanent magnets 32-1 and twenty-four second permanent magnets 32-2, that is, a total of forty-eight permanent magnets 32 are embedded. With this, the rotor 30 including twenty-four poles is formed.

In the cross section illustrated in FIG. 4, flux barriers 37*a* formed integrally with the first magnet slot 33-1 are formed on both longitudinal end portions of each first, magnet, slot 33-1. Similarly, flux barriers 37*b* formed integrally with the second magnet slot 33-2 are formed on both longitudinal end portions of each second magnet slot 33-2.

The inter-pole hole portion 34 is formed between the first, magnet slot 33-1 and the second magnet slot 33-2 adjacent to each other in the circumferential direction. The inter-pole hole portion 34 is separate from both the first magnet slot 33-1 and the second magnet slot 33-2. The inter-pole hole portion 34 is surrounded by the edge portion 34*a* and the edge portion 34*b* each formed along the circumferential direction and the edge portion 34*c* and the edge portion 34*d* each formed along the radial direction. The inter-pole hole portion 34 is arranged on the q-axis so as to straddle the q-axis. The q-axis passes through the circumferential center portion of the inter-pole hole portion 34.

The inter-pole hole portion 34 is arranged on the side opposite to the stator 20 with respect to the first circle 61. The edge portion 34*a*, which is the edge portion of the inter-pole hole portion 34 and is located on the stator 20 side, is formed along the circumference of the first circle 61. In this embodiment, the edge portion 34*a* of the inter-pole hole portion 34 is located on the outer peripheral side with respect to the first circle 61. The edge portion 34*a* of the inter-pole hole portion 34 may match the circumference of the first circle 61.

The inter-pole hole portion 34 is arranged on the stator 20 side with respect to the second circle 62. In this embodiment, the edge portion 34*b*, which is the edge portion of the inter-pole hole portion 34 and is located on the side opposite to the stator 20, is located on the inner peripheral side with respect to the second circle 62. The edge portion 34*b* of the inter-pole hole portion 34 may match the circumference of the second circle 62.

The rib portion 35*a* is formed between the inter-pole hole portion 34, and the first magnet slot 33-1 and the flux barrier 37*a*. The rib portion 35*b* is formed between the inter-pole hole portion 34, and the second magnet slot 33-2 and the flux barrier 37*b*.

According to this embodiment, the same effects as those of the second embodiment are obtained. In the rotating electric machine in which the two permanent magnets 32 are arranged in a V shape as in this embodiment, as compared to the rotating electric machine in which the magnetic-pole surface of each permanent magnet 32 is arranged along the circumferential direction as in the first and second embodiments, the weight of the outer peripheral side portion of the magnet slot group in one set is increased. Thus, bending stress, which is caused in the rib portion 35*a* and the rib portion 35*b* due to a centrifugal force, tends to foe increased. Thus, in the rotating electric machine of this embodiment, a stress reducing effect similar to that of the second embodiment is exerted more effectively.

Further, the inter-pole hole portion 34 of this embodiment is formed in a rectangular shape having a certain circumferential width. With this, the magnetic flux of the permanent magnet 32 can be suppressed from being inhibited by the inter-pole hole portion 34, thereby being capable of suppressing an adverse effect on the torque of the rotating electric machine.

Meanwhile, the inter-pole hole portion 34 of this embodiment, may be formed to spread to the inner portion of the permanent magnet 32 in the radial direction. With this, the rigidity of the rotor core 31 at the vicinity cf the magnet slot 33 can be further averaged, thereby being capable of further relaxing stress concentration caused in the rotor core 31 due to a centrifugal force.

Fourth Embodiment

Figure 5:
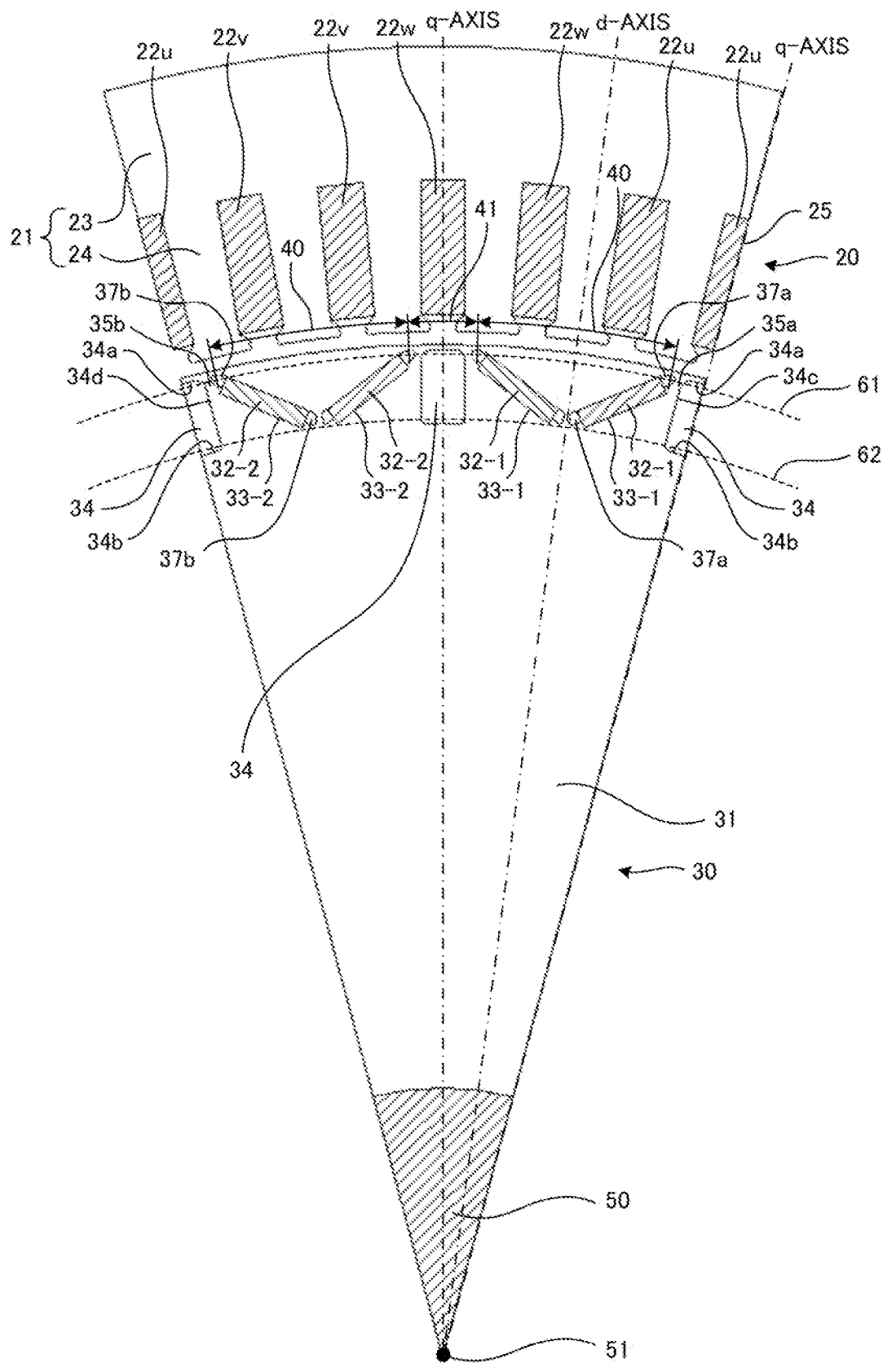
FIG. 5 is a sectional view for illustrating a configuration of a part of a rotating electric machine according to a fourth embodiment, which is taken perpendicularly to the rotation axis.

A rotating electric machine according to a fourth embodiment is described. FIG. 5 is a sectional view for illustrating a configuration of a part of the rotating electric machine according to this embodiment, which is taken perpendicularly to the rotation axis. Components having the same function and effect as those of any one of the first to third embodiments are denoted by the same reference symbols, and description thereof is omitted.

As illustrated in FIG. 5, the stator core 21 includes the yoke portion 23 having an annular shape, and seventy-two tooth portions 24 each protruding from the yoke portion 23 toward the radially inner side. The seventy-two tooth portions 24 are arranged at equal intervals in the circumferential direction. A coil slot 25 is formed between two tooth portions 24 adjacent to each other. In seventy-two coil slots 25, the U phase coils 22$u$, the V phase coils 22$v$, and the W phase coils 22$w$ are arranged so as to be arrayed in the order of the U phase coil, the U phase coil, the W phase coil, the W phase coil, the V phase coil, the V phase coil, the U phase coil, . . . in the circumferential direction. In this manner, the rotating electric machine of this embodiment forms a full-pitch distributed winding motor including twenty-four poles and seventy-two slots, in which two slots are provided for each pole and each phase.

The configuration of the rotor 30 is the same as that of the third embodiment. According to this embodiment, the same effects as those of the third embodiment are obtained.

Fifth Embodiment

Figure 6:
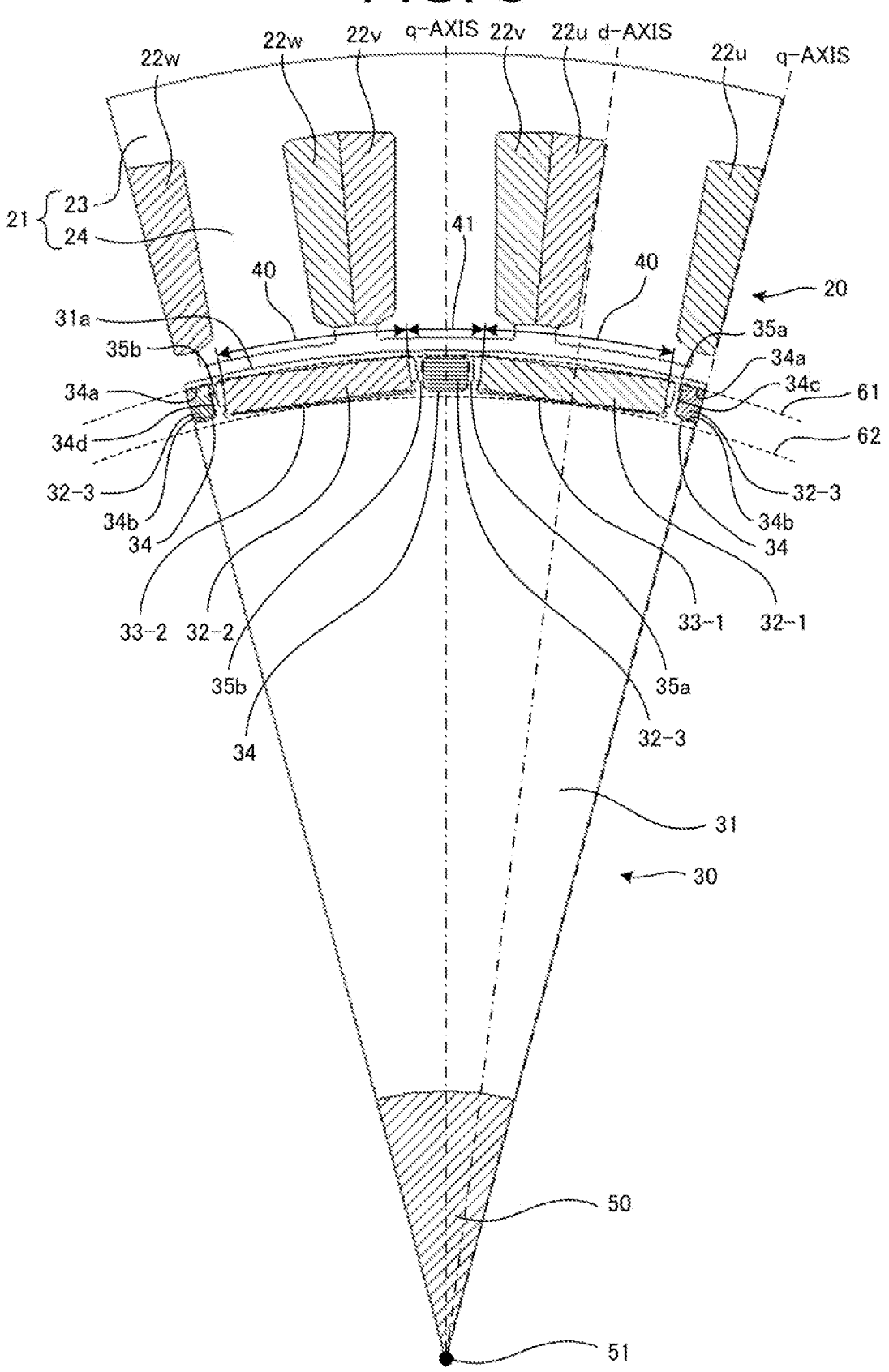
FIG. 6 is a sectional view for illustrating a configuration of a part of a rotating electric machine according to a fifth embodiment, which is taken perpendicularly to the rotation axis.

A rotating electric machine according to a fifth embodiment is described. FIG. 6 is a sectional view for illustrating a configuration of a part of the rotating electric machine according to this embodiment, which is taker, perpendicularly to the rotation axis. Components having the same function and effect as those of any one of the first to fourth embodiments are denoted by the same reference symbols, and description thereof is omitted.

As illustrated in FIG. 6, one inter-pole hole portion 34 is formed between the first magnet slot 33-1 and the second magnet slot 33-2. The inter-pole hole portion 34 is separate from both the first magnet slot 33-1 and the second magnet slot 33-2. A third permanent magnet 32-3 is inserted into the inter-pole hole portion 34. In the circumferential direction, the third permanent magnet 32-3 is located between the first permanent magnet 32-1 and the second permanent magnet 32-2. The third permanent magnet 32-3 functions as an inter-pole permanent magnet that supplements field magnetic fluxes of the first permanent magnet 32-1 and the second permanent magnet 32-2.

An arrangement direction of the third permanent magnet 32-3 extends along the circumferential direction of the rotor 30. The third permanent magnet 32-3 is magnetized along the circumferential direction. That is, a magnetization direction of the third permanent magnet 32-3 is orthogonal to the magnetization direction of each of the first permanent magnet 32-1 and the second permanent magnet 32-2. It is desired that magnetization directions of two third permanent magnets 32-3 adjacent to each other across the first permanent magnet 32-1 or the second permanent magnet 32-2 in the circumferential direction be opposite to each other. In this case, the permanent magnets are arrayed in the circumferential direction of the rotor 30 in Halbach array. Other configurations are the same as those of the second embodiment.

As described above, in the rotating electric machine according to this embodiment, the rotor 30 further includes the third permanent magnet 32-3 inserted into the inter-pole hole portion 34. The third permanent magnet 32-3 is magnetized along the circumferential direction.

According to this configuration, the same effects as those of the second embodiment are obtained, and, in addition, the field magnetic fluxes of the first permanent magnet 32-1 and the second permanent magnet 32-2 can be supplemented by the third permanent magnet 32-3. Thus, the torque and the output of the rotating electric machine can be further improved.

In the above-mentioned first to fifth embodiments, the motor is given as an example as the rotating electric machine, but the rotating electric machine of each of the above-mentioned first to fifth embodiments may operate as an generator. Even when the rotating electric machine of each of the above-mentioned first to fifth embodiments operates as the generator, the same effects as those in the case in which the rotating electric machine operates as the motor are obtained.

In the above-mentioned first to fifth embodiments, the inter-pole hole portion 34 may be divided into a plurality of parts in the circumferential direction. According to this configuration, a rib portion extending along the radial direction can be additionally provided, thereby being capable of further reducing stress caused in the rotor core 31 due to a centrifugal force.

In the above-mentioned first to fifth embodiments, the rotating electric machine of an inner rotor type, in which the rotor 30 is arranged on the inner peripheral side of the stator 20, is given as an example, but the present invention may be applied to a rotating electric machine of an outer rotor type, in which the rotor 30 is arranged on the outer peripheral side of the stator 20. In the case of the rotating electric machine of an outer rotor type, the first circle 61 is an inscribing circle having the rotation axis 51 as a center and being inscribed in both the first magnet slot 33-1 and the second magnet slot 33-2. The second circle 62 is a circumscribing circle having the rotation axis 51 as a center and circumscribing both the first magnet slot 33-1 and the second magnet slot 33-2. Also in the rotating electric machine of an outer rotor type, the same effects as those of the rotating electric machine of an inner rotor type are obtained.

In the above-mentioned first to fifth embodiments, the edge portion 34$a$ of the inter-pole hole portion 34 may be formed in an arc shape or formed in a linear shape. Similarly, the edge portion 34$b$ of the inter-pole hole portion 34 may be formed in an arc shape or formed in a linear shape. When both the edge portion 34$a$ and the edge portion 34$b$ are formed in a linear shape, the inter-pole hole portion 34 may be formed in a rectangular shape.

The first to fifth embodiments described above may be carried out in various combinations.

What is claimed is:

1. A rotating electric machine, comprising:

a stator; and a rotor provided so as to be rotatable with respect to the stator, wherein the stator and the rotor are opposed to each other via a gap, wherein the rotor includes:

a rotor core in which a first magnet slot and a second magnet slot adjacent to each other in a circumferential direction are formed;

a first permanent magnet inserted into the first magnet slot, a shape of the first permanent magnet being the same as a shape of the first magnet slot; and a second permanent magnet inserted into the second magnet slot, a shape of the second permanent magnet being the same as a shape of the second magnet slot, wherein a polarity of a magnetic-pole surface of the first permanent magnet which is opposed to the stator and a polarity of a magnetic-pole surface of the second permanent magnet which is opposed to the stator are different from each other, wherein the rotor core includes an inter-pole hole portion formed between the first magnet slot and the second magnet slot so as to extend in an axial direction, wherein, when, in a cross section perpendicular to the axial direction, a circle having a rotation axis of the rotor as a center and circumscribing an edge portion of each of the first magnet slot and the first permanent magnet and the second magnet slot and the second permanent magnet on the stator side is defined as a first circle, in the cross section, the inter-pole hole portion is arranged on a side opposite to the stator with respect to the first circle, and, in the cross section, the inter-pole hole portion is spaced apart from the gap, and, in the cross section, the inter-pole hole portion is completely surrounded by the rotor core via a closed edge, and the closed edge of the inter-pole hole portion on the stator side matches the first circle, wherein the first magnet slot and the second magnet slot are arranged such that a longitudinal direction of the first magnet slot and a longitudinal direction of the second magnet slot are inclined with respect to the circumferential direction such that a first end side of the first magnet slot and a first end side of the second magnet slot in the longitudinal direction are closer to the inter-pole hole portion than a second end side of the first magnet slot and a second end side of the second magnet slot in the longitudinal direction, opposite to the first end sides, and the first end sides are closer to the first circle than the second end sides, wherein, at the first end side of the first magnet slot, a first flux barrier is formed between the first magnet slot and the inter-pole hole portion and a first rib is formed between the first flux barrier and the inter-pole hole portion, and wherein, at the first end side of the second magnet slot, a second flux barrier is formed between the second magnet slot and the inter-pole hole portion and a second rib is formed between the second flux barrier and the inter-pole hole portion.

2. The rotating electric machine according to claim 1, wherein, when, in the cross section, a circle having the rotation axis as a center and circumscribing an edge portion of each of the first magnet slot and the second magnet slot on the side opposite to the stator is defined as a second circle, in the cross section, the first magnet slot and the second magnet slot are between the first circle and the second circle.

3. The rotating electric machine according to claim 1, wherein the inter-pole hole portion is separate from both the first magnet slot and the second magnet slot, and wherein the inter-pole hole portion is provided so as to straddle a q-axis of the rotor.

4. The rotating electric machine according to claim 3, wherein the rotor further includes a third permanent magnet inserted into the inter-pole hole portion, and wherein the third permanent magnet is magnetized along the circumferential direction.

5. The rotating electric machine according to claim 1, wherein, in the cross section, a longitudinal direction of each of the first magnet slot and the second magnet slot is perpendicular to a radial direction.

6. The rotating electric machine according to claim 1, wherein the inter-pole hole portion comprises a first inter-pole hole portion and a second inter-pole hole portion, and wherein a rib portion is provided between the first inter-pole hole portion and the second inter-pole hole portion.

7. The rotating electric machine according to claim 1, wherein the closed edge of the inter-pole hole portion on the stator side is formed along an entire circumference of the first circle.

8. A rotating electric machine, comprising:

a stator; and a rotor provided so as to be rotatable with respect to the stator, wherein the stator and the rotor are opposed to each other via a gap, wherein the rotor includes:

a rotor core in which a first magnet slot and a second magnet slot adjacent to each other in a circumferential direction are formed;

a first permanent magnet inserted into the first magnet slot, a shape of the first permanent magnet being the same as a shape of the first magnet slot; and a second permanent magnet inserted into the second magnet slot, a shape of the second permanent magnet being the same as a shape of the second magnet slot, wherein a polarity of a magnetic-pole surface of the first permanent magnet which is opposed to the stator and a polarity of a magnetic-pole surface of the second permanent magnet which is opposed to the stator are different from each other, wherein the rotor core includes an inter-pole hole portion formed between the first magnet slot and the second magnet slot so as to extend in an axial direction, wherein, when, in a cross section perpendicular to the axial direction, a circle having a rotation axis of the rotor as a center and circumscribing an edge portion of each of the first magnet slot and the first permanent magnet and the second magnet slot and the second permanent magnet on the stator side is defined as a first circle, in the cross section, the inter-pole hole portion is arranged on a side opposite to the stator with respect to the first circle, and, in the cross section, the inter-pole hole portion is spaced apart from the gap, and, in the cross section, the inter-pole hole portion is completely surrounded by the rotor core via a closed edge, and the closed edge of the inter-pole hole portion on the stator side matches the first circle, wherein a first end side of a longitudinal direction of the first magnet slot and a first end side of a longitudinal direction of the second magnet slot are closer to the inter-pole hole portion than a center portion of the longitudinal direction of the first magnet slot and a center portion of the longitudinal direction of the second magnet slot, the first end sides are closer to the first circle than the center portions, wherein, at the first end side of the first magnet slot, a first flux barrier is formed between the first magnet slot and the inter-pole hole portion and a first rib is formed between the first flux barrier and the inter-pole hole portion, and wherein, at the first end side of the second magnet slot, a second flux barrier is formed between the second magnet slot and the inter-pole hole portion and a second rib is formed between the second flux barrier and the inter-pole hole portion.

9. The rotating electric machine according to claim 1, wherein, when, in the cross section, a circle having the rotation axis as a center and circumscribing an edge portion of each of the first magnet slot and the second magnet slot on the side opposite to the stator is defined as a second circle, in the cross section, the inter-pole hole portion is located on the stator side with respect to the second circle.

\* \* \* \* \*